(12) United States Patent
Mandal (10) Patent No.: US 10,352,152 B2
(45) Date of Patent: Jul. 16, 2019

(54) ACOUSTIC CALIPERING AND ANALYSIS OF ANNULUS MATERIALS

(71) Applicant: Halliburton Energy Services, Inc., Houston, TX (US)

(72) Inventor: Batakrishna Mandal, Missouri City, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 319 days.

(21) Appl. No.: 15/314,737

(22) PCT Filed: Jul. 15, 2014

(86) PCT No.: PCT/US2014/046623
§ 371 (c)(1),
(2) Date: Nov. 29, 2016

(87) PCT Pub. No.: WO2016/010517
PCT Pub. Date: Jan. 21, 2016

(65) Prior Publication Data
US 2017/0199295 A1    Jul. 13, 2017

(51) Int. Cl.
*G01V 1/50* (2006.01)
*E21B 17/10* (2006.01)
(Continued)

(52) U.S. Cl.
CPC ........ *E21B 47/082* (2013.01); *E21B 17/1078* (2013.01); *E21B 33/14* (2013.01);
(Continued)

(58) Field of Classification Search
CPC .... E21B 47/082; E21B 47/08; E21B 47/0005; E21B 33/14; G01V 1/50
See application file for complete search history.

(56) References Cited

U.S. PATENT DOCUMENTS 5,924,499 A    7/1999    Birchak et al.
6,084,826 A    7/2000    Leggett, III
(Continued)

OTHER PUBLICATIONS

Schlumberger Oilfield Glossary entries for "cement bond log", "cementing", and "pulse-echo", accessed Dec. 10, 2018 via www.oilfield.slb.com.*
(Continued)

*Primary Examiner* — Blake E Michener
(74) *Attorney, Agent, or Firm* — Chamberlain Hrdlicka (57) ABSTRACT

An apparatus and method may operate to mount acoustic sensors, azimuthally offset from each other, to the exterior of a casing. After the casing and acoustic sensors are in the borehole, signals are provided to the acoustic sensors to cause the acoustic sensors to emit acoustic signals into the annulus around the casing. The method further includes detecting reflected compression waves, shear waves or a combination or conversion thereof at the acoustic sensors to generate a set of two]way travel times of the acoustic signals. The method can further include generating distance measurements of a distance between corresponding acoustic sensors and points on the borehole wall based on the two]way travel times, to determine a position of the casing within the borehole. The method can further include identifying fluids based on the two]way travel times. Additional apparatus, systems, and methods are disclosed.

21 Claims, 11 Drawing Sheets

(51) Int. Cl.
    *E21B 33/14*   (2006.01)
    *E21B 47/00*   (2012.01)
    *E21B 47/01*   (2012.01)
    *E21B 47/08*   (2012.01)

(52) U.S. Cl.
    CPC ............ *E21B 47/0005* (2013.01); *G01V 1/50* (2013.01); *E21B 47/011* (2013.01)

(56) References Cited

U.S. PATENT DOCUMENTS

| | | | |
|---|---|---|---|
| 8,256,565 B2* | 9/2012 | Pabon | G01V 1/52 166/254.2 |
| 2002/0134587 A1* | 9/2002 | Rester | E21B 47/10 175/48 |
| 2003/0029241 A1* | 2/2003 | Mandal | E21B 49/003 73/586 |
| 2006/0233048 A1 | 10/2006 | Froelich et al. | |
| 2006/0249307 A1* | 11/2006 | Ritter | E21B 47/08 175/40 |
| 2009/0112262 A1 | 4/2009 | Pool et al. | |
| 2011/0186290 A1* | 8/2011 | Roddy | E21B 43/25 166/253.1 |
| 2011/0192592 A1* | 8/2011 | Roddy | E21B 47/01 166/250.01 |
| 2012/0205103 A1 | 8/2012 | Ravi et al. | |
| 2015/0003203 A1* | 1/2015 | Froelich | E21B 47/0005 367/86 |
| 2017/0114628 A1* | 4/2017 | Khalaj Amineh | E21B 47/082 |

OTHER PUBLICATIONS

International Search Report and Written Opinion issued in corresponding PCT application No. PCT/US2014/046623, dated Apr. 15, 2013, 2 pgs.

* cited by examiner

ACOUSTIC CALIPERING AND ANALYSIS OF ANNULUS MATERIALS

BACKGROUND

Understanding the shape of a borehole and the placement of a casing inside the borehole are important for the maintenance of well integrity. Acoustic calipering techniques and systems can map casing placement inside the borehole to aid in attaining this understanding. However, available acoustic systems are typically mounted inside the casing and, as such, are isolated from annular regions between a casing string and formation. Therefore, available acoustic systems cannot detect many conditions that would be of interest to an operator during or after cementation processes when operators place cement in the annular regions.

DETAILED DESCRIPTION

To address some of the challenges described above, as well as others, apparatuses, systems, and methods are described herein for using acoustic sensors to determine the position of a casing within a borehole, to determine the shape of the borehole, and to identify and determine properties of fluids in an annulus between the casing and a formation.

Figure 1:
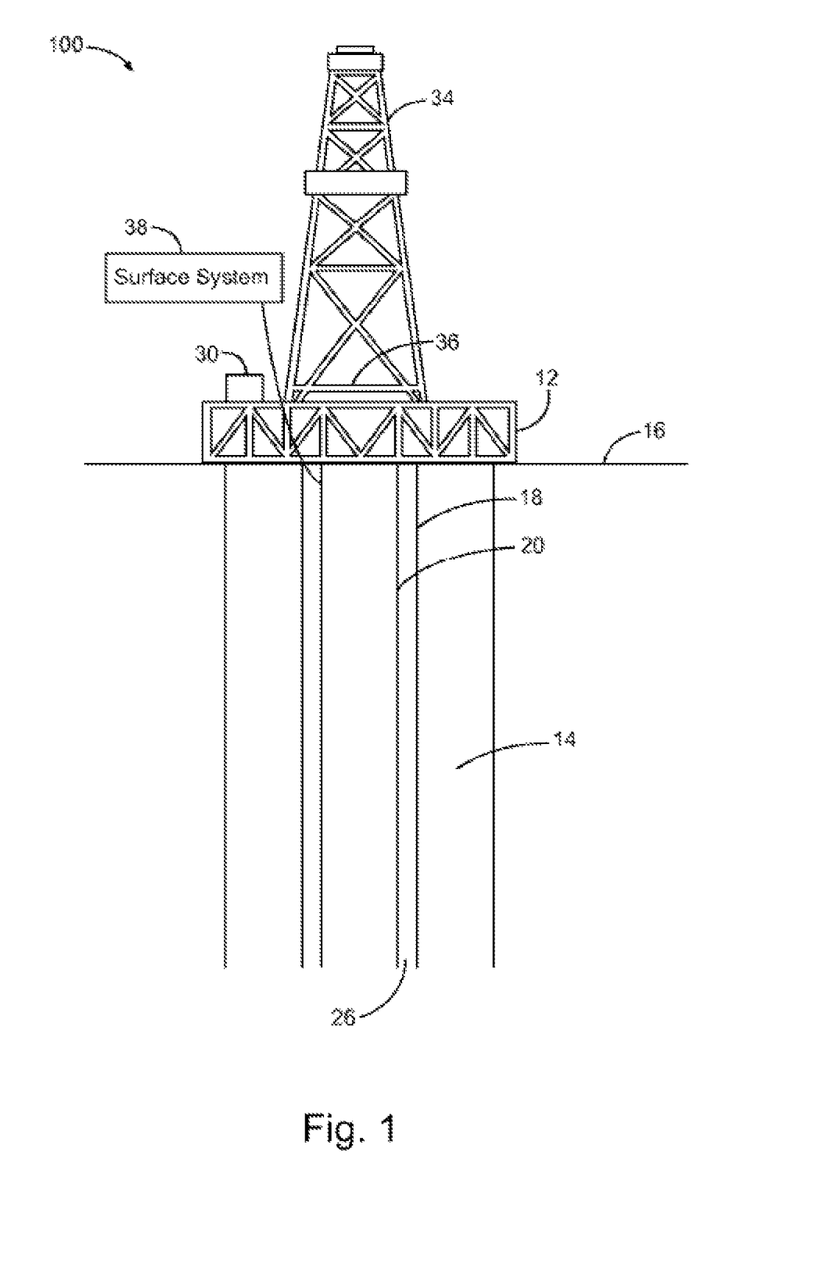
FIG. 1 illustrates a drilling system in which example embodiments can be implemented.

FIG. 1 illustrates a drilling system 100 in which example embodiments can be implemented. Drilling system 100 includes a drilling rig 12 centered over a subterranean oil or gas-bearing formation 14 located below the earth's surface 16. Rig 12 includes a derrick 34 supporting a hoisting apparatus 36 for raising and lowering pipe strings such as casing 20, and other equipment into a wellbore 18. One or more pumps 30 are arranged for pumping of a variety of wellbore fluids as may be used for various well operations (e.g., drilling mud, well control fluids, and cement or other sealants, etc.).

Wellbore 18 has been drilled through the various earth strata, including formation 14. While wellbore 18 is shown as being drilled vertically, wellbore 18 can also be drilled horizontally. During well completion, casing 20 is placed in wellbore 18 to stabilize the well and to facilitate the production of oil and gas from formation 14. Casing 20 together with the formation sidewalls defining wellbore 18 define an annulus 26 surrounding casing 20. The mapping the casing 20 placement inside the borehole is important information for the well integrity.

Drilling mud or other fluids can initially be in place in annulus 26 to maintain pressure control of the well. "Cement" or another form of sealant is used to secure casing 20 in place and to isolate the formations penetrated by wellbore 18 from one another. In an example cementation process, a cement-based substance is mixed to form a cement slurry, and the cement slurry is pumped down the inside of casing 20. As the cement slurry reaches the bottom of casing 20, the cement slurry flows out of casing 20 and up through the annulus, displacing any fluid such as drilling mud in annulus 26. The identification of these fluids, the monitoring of this cementing process, and the monitoring of the cure state and detection of contamination states in the cement, are important for maintaining the integrity of isolation between casing 20 and formation 14.

Embodiments provide systems, including acoustic systems mounted on the outside of casing 20, that can determine casing 20 placement inside wellbore 18 while also monitoring the fluid types passing through annulus 26 during the cementation process. FIGS. 2-10 depict various views and embodiments of acoustic systems.

Acoustic Systems

Figure 2:
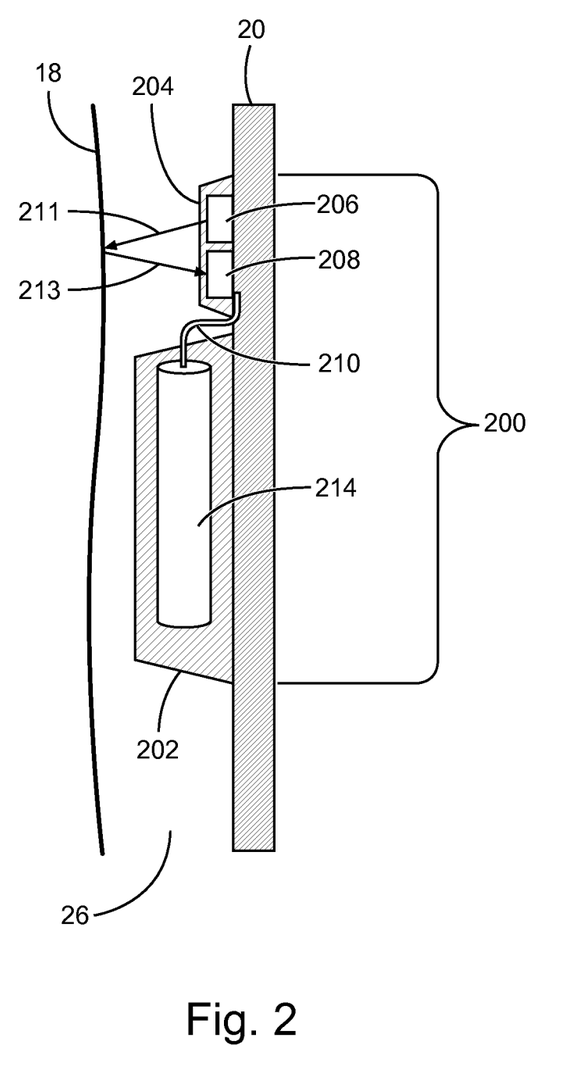
FIG. 2 depicts a side view of a casing having an acoustic system mounted thereto for determining casing placement and for monitoring fluids passing through the annulus in accordance with some embodiments.

FIG. 2 depicts a side view of a casing having an acoustic system 200 mounted thereto for determining casing placement and for monitoring fluids passing through annulus 26 in accordance with some embodiments. Casing 20 is placed inside wellbore 18 by a casing centralizer 202, which can help maintain casing 20 position inside wellbore 18.

Acoustic system 200 includes an acoustic sensor 204. Acoustic sensor 204 includes a transmitter 206 and a receiver 208. In embodiments, transmitter 206 transmits acoustic signals 211, and receiver 208 receives acoustic signals 213 in response to acoustic signals 211 being reflected by a surface (e.g., a borehole wall). Transmitted acoustic signals 211 can include compression waves, shear waves, or a combination thereof, and similarly received acoustic signals 213 can include compression waves, shear waves, or a combination thereof depending on properties of materials in annulus 26 as described later herein. The surface can include, for example, a boundary between two distinct materials. For example, the surface can include a boundary between casing 20 and wellbore 18 or between casing 20 and an annular fluid (not shown in FIG. 2) such as drilling mud, cement, etc.

While FIG. 2 illustrates separate elements for receiver 208 and transmitter 206, embodiments are not limited thereto. In some embodiments, receiver 208 and transmitter 206 can be included within one acoustic transducer. For example, in some embodiments, acoustic sensor 204 can function as a pulse/echo sensor, wherein a single transducer can transmit and receive compression waves, shear waves, or a combination thereof. In other embodiments, acoustic sensor 204 can function as pitch/catch sensor, wherein separate acoustic transducers transmit and receive compression waves, shear waves, or a combination thereof. At least one acoustic sensor 204 can include a transducer for generating shear waves. Acoustic sensor 204 will be coupled through connections 210 to electrical circuitry such as electrical circuitry 214, described in more detail later herein with reference to FIG. 3. Electrical circuitry 214 can be enclosed within casing centralizer 202.

Figure 3:
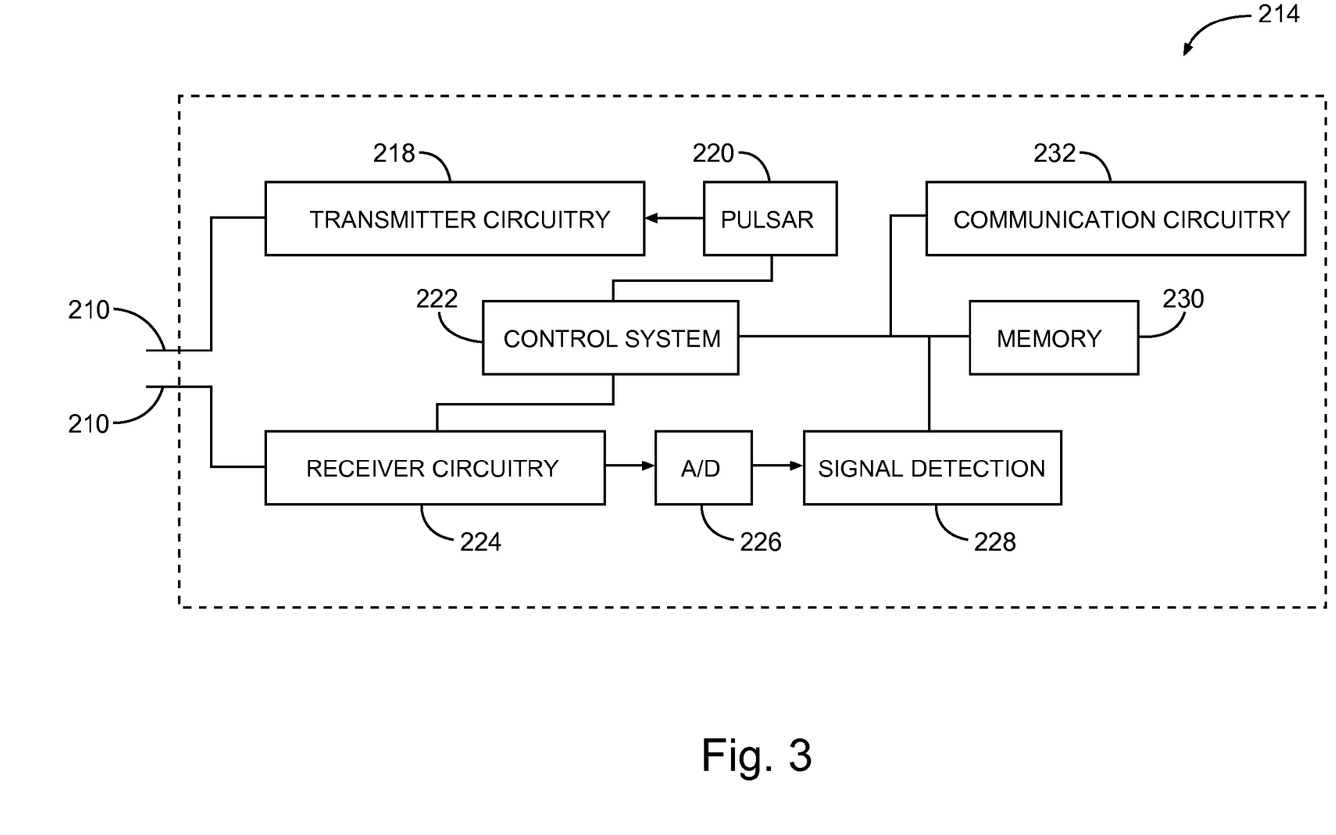
FIG. 3 is a schematic diagram of electrical circuitry as can be used for implementing some embodiments.

FIG. 3 is a schematic diagram of electrical circuitry 214 as can be used for implementing some embodiments. Transmitter 206 and receiver 208 (FIG. 2) will connect through connections 210 to transmitter circuitry 218 and receiver circuitry 224.

Transmitter circuitry 218 will receive drive signals from a pulsar 220. A control system 222 will control pulsar 220 to provide pulse inputs with pulsing time and durations based on, for example, predicted identities and properties of fluids in annulus 26. The pulse inputs can have frequencies in a range of about 50 kHz to 500 kHz. Control system 222 can include a microcontroller although embodiments are not limited thereto. Receiver circuitry 224 will receive signals over connection 210 from at least one of transmitter 206 and receiver 208, and digitize these signals using an A/D converter 226.

Signal detection circuitry 228 can estimate two-way travel times, amplitudes, and any other parameters of received waves, such as compression waves, or other waves such as shear waves as described later herein with reference to FIGS. 4-10. Memory 230 will store data such as two-way travel times, peak amplitudes, clock times at which acoustic signals were emitted, etc., as well as computer-readable instructions for processing this data or for performing any other processing in accordance with embodiments described herein. Memory 230 may be any form of electrical storage mechanism, and in most examples will include one or more of volatile or nonvolatile memory, including one or more of DRAM, SRAM, Flash, MRAM, and combinations of any of the foregoing, as well as other known forms of memory devices. For purposes of the present disclosure, any such storage mechanism, whether volatile or nonvolatile memory shall be considered a non-transitory storage device (or memory).

Communication circuitry 232 will telemeter at least some of data from memory 230 to a system, such as surface system 38 (FIG. 1). Communication circuitry 232 can include components for wireless communication, acoustic telemetry, mud-pulse telemetry, or any other type of communication component.

As described in more detail herein with reference to FIGS. 4-7, control system 222, signal detection circuitry 228, processor at surface system 38, or another processor will use the clock time and corresponding two-way travel time measurements from acoustic system 200 to estimate the borehole shape and annulus fluid acoustic speed. As also described in more detail later herein with reference to FIGS. 8-11, control system 222, signal detection circuitry 228, processor at surface system 38, or another processor will analyze time history of two-way travel times and clock times to confirm cement placement and well integrity inside the wellbore.

While electrical circuitry 214 is described with reference to a plurality of modules, it will be understood that some functionalities described herein may be implemented on a single processor or microcontroller. For example, signal detection 228 can be implemented on the same microcontroller as is used for implementing control system 222. Software, hardware, firmware, or any combination thereof can be used to implement functionalities of any component of electrical circuitry 214 in accordance with embodiments. Instructions can be stored in memory 230.

Figure 4:
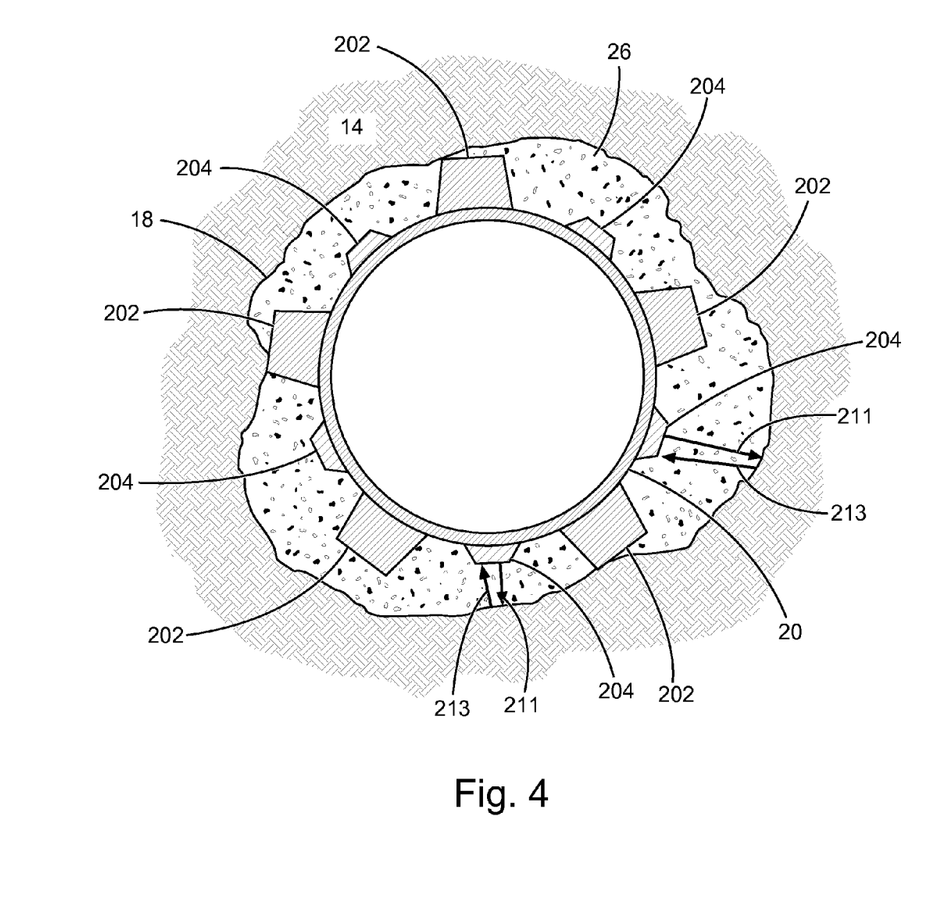
FIG. 4 depicts a top view of a casing, to which an acoustic system has been mounted in accordance with a first embodiment.

FIG. 4 depicts a top view of a casing 20, to which an acoustic system 200 has been mounted in accordance with a first embodiment. As shown in FIG. 4, acoustic sensors 204 can mounted on the outside of casing 20 between each casing centralizer 202. Additional acoustic systems 200 including acoustic sensors 204 can be mounted at a longitudinal distance from each other along casing 20.

While FIG. 4 depicts five acoustic sensors 204, embodiments are not limited thereto. However, at least three acoustic sensors 204 are needed to evaluate the borehole shape and placement of the casing inside a circular borehole, and at least five acoustic sensors 204 are needed to evaluate an elliptical or unknown borehole shape and placement of a casing 20 therein. In the embodiment illustrated in FIG. 4, acoustic sensors 204 will transmit acoustic signals 211 outwardly, into annulus 26, and acoustic signals 213 will be reflected back to acoustic sensors 204.

Figure 5:
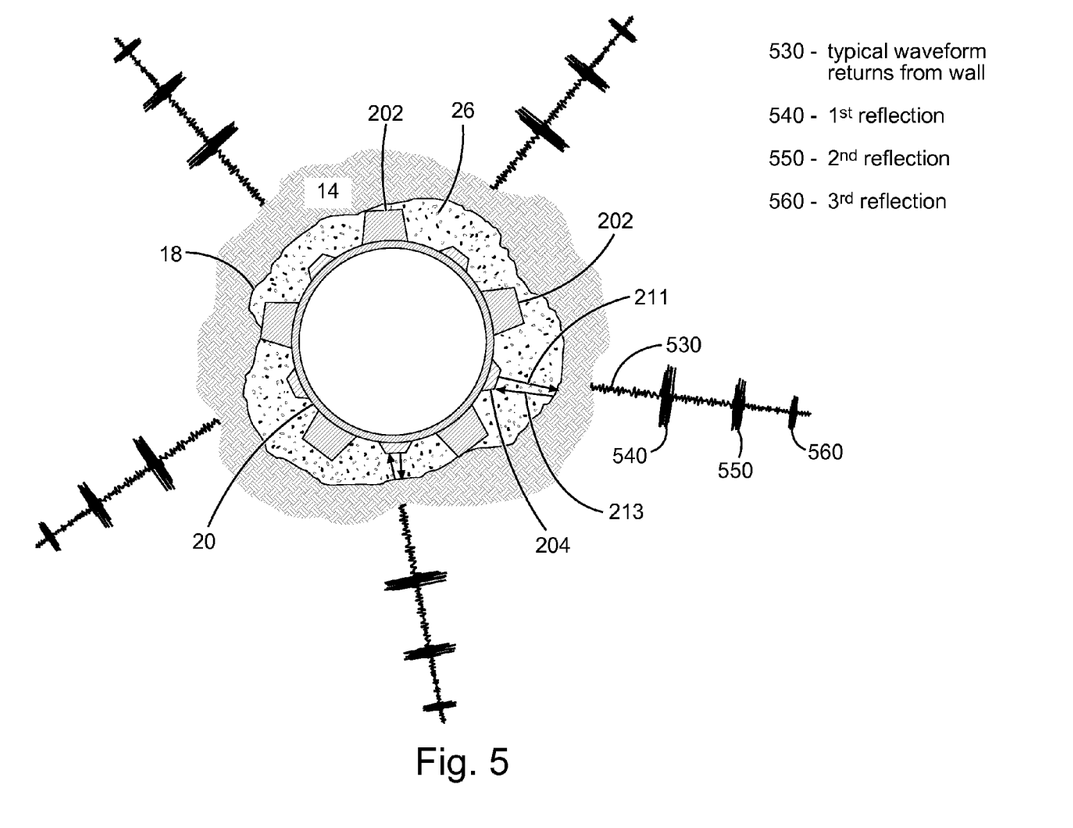
FIG. 5 illustrates an acoustic waveform reflected from sidewalls defining a wellbore or other boundaries as described herein in accordance with some embodiments.

FIG. 5 illustrates an acoustic waveform 530 as can be reflected from sidewalls defining wellbore 18 or other boundaries (e.g., a second casing) as described later herein in accordance with some embodiments. It will be understood that the acoustic waveform 530 illustrated in FIG. 5 is not drawn to scale and serves to illustrate only that multiple reflections can occur at each acoustic sensor 204. In the example embodiment illustrated in FIG. 5, three reflections 540, 550, and 560 are depicted. However, embodiments are not limited thereto and there may be fewer than three reflections or more than three reflections in some embodiments.

Figure 6:
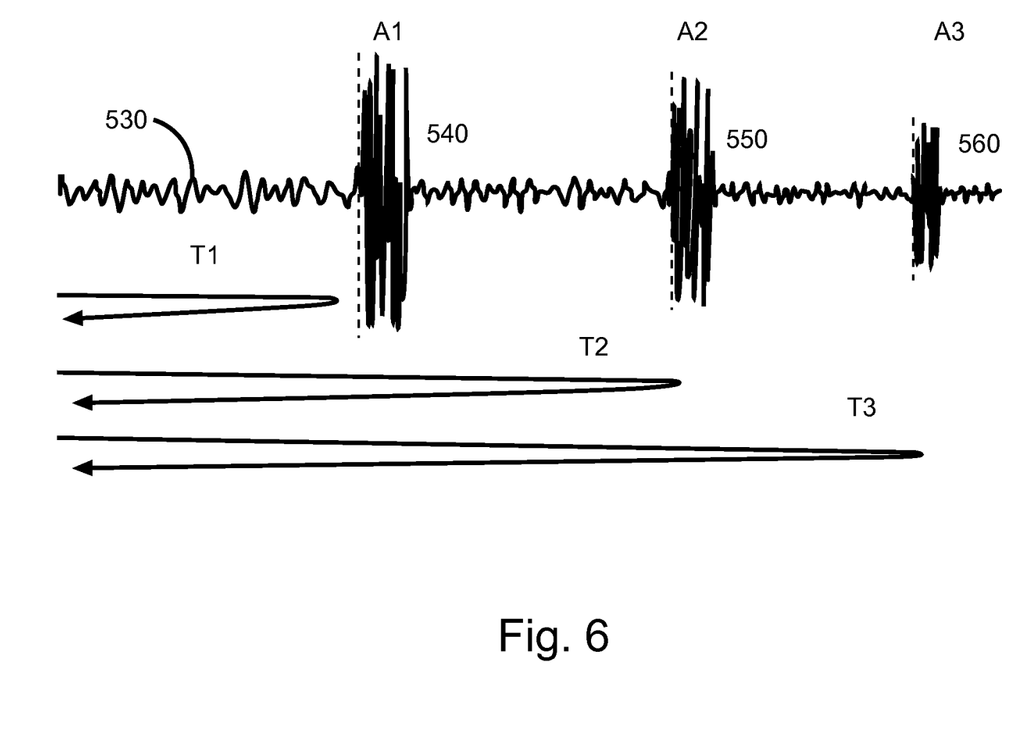
FIG. 6 illustrates amplitudes and timing of an acoustic waveform with three reflections as can be received at an acoustic sensor in accordance with some embodiments.

FIG. 6 illustrates amplitudes and timing of an acoustic waveform 530 with three reflections 540, 550 and 560 received at an acoustic sensor 204 in accordance with some embodiments. For example, reflections 540, 550 and 560 arrive at a receiver 208 of an acoustic sensor 204 with amplitudes A1, A2, and A3 and with two-way travel times T1, T2 and T3 respectively. Each other acoustic sensor 204 on casing 20 can receive the same or similar acoustic waveforms 530. Based on the amplitudes and two-way travel times associated with each acoustic waveform 530, a processor, for example a processor of surface system 38 (FIG. 1) or electronics package 214 (FIG. 3) can calculate the position of casing 20 in the borehole, estimate properties of fluids in annulus 26, or perform any other monitoring or detection functions as described herein with reference to FIGS. 7-11. For example, if parameters, such as amplitude A1 and two-way travel time T1, of first reflections 540 are the same when received at each individual acoustic sensor 204, a processor can determine based on calculations described later herein, that the borehole shape is round and that casing 20 is centered within the borehole.

Determining Casing Placement in the Borehole

Figure 7:
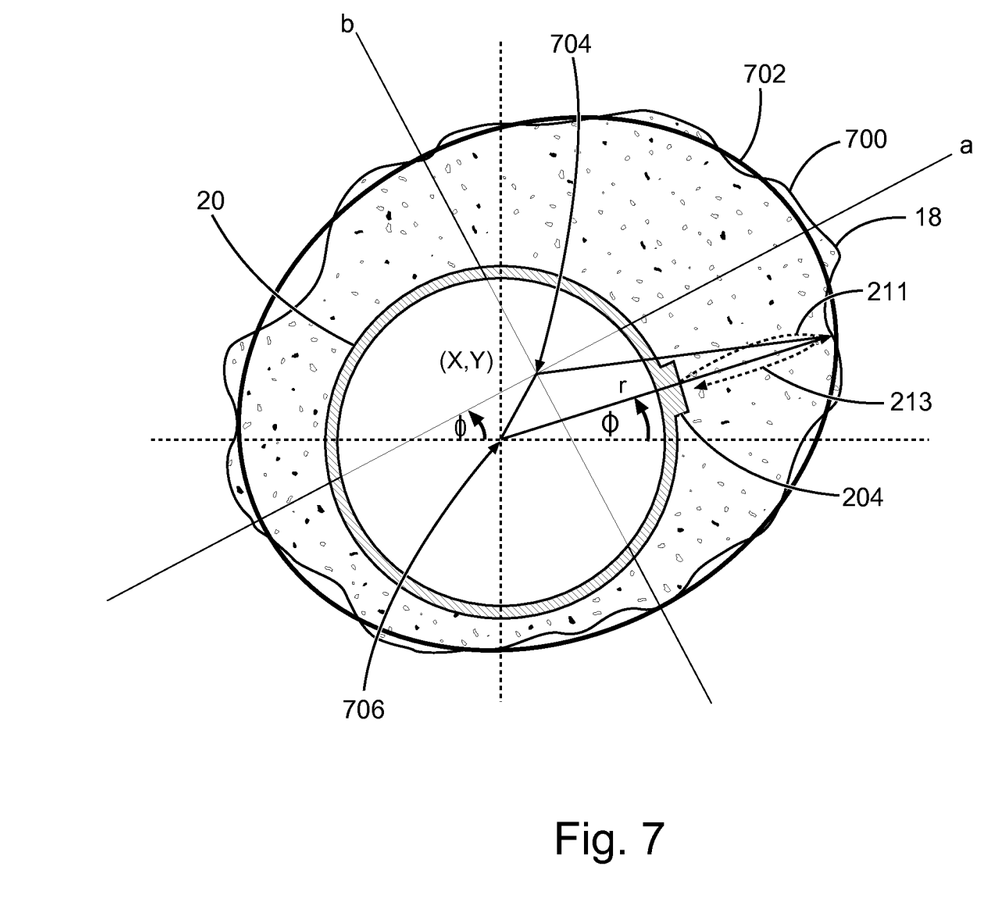
FIG. 7 is a schematic diagram of casing within a borehole that illustrates geometrical attributes as can be used by a processor to calculate casing placement in a borehole in accordance with some embodiments.

FIG. 7 is a schematic diagram of casing 20 within a borehole 700. FIG. 7 illustrates geometrical attributes as can be used by a processor to calculate casing 20 placement in a borehole in accordance with some embodiments.

A borehole 700 wall can be approximated as an ellipse 702 with a center 704 at coordinates (X, Y) relative to an example casing center 706. For purposes of describing example embodiments, ellipse 702 has a major axis a, a minor axis b, and an inclination angle θ with reference to casing center 706. Distance r is the distance from casing center 706 to borehole 700 wall at a sensor placement reference angle φ. A processor, for example a processor of surface system 38 (FIG. 1) or a processor associated with any component of electrical circuitry 214 (FIG. 3), can calculate r based on the outer diameter of casing 20 and the two-way travel time for an acoustic signal to travel between an acoustic sensor 204 and ellipse 702 approximating borehole 700 wall (acoustic signal 211), and back to acoustic sensor 204 (acoustic signal 213).

Using parameters r, φ, θ, a, and b, an equation of ellipse 702 can be expressed as:

$$\frac{((r\cos(\phi) - X)\cos(\theta) + (r\sin(\phi) - Y)\sin(\theta))^2}{a^2} + \frac{(-(r\cos(\phi) - X)\sin(\theta) + (r\sin(\phi) - Y)\cos(\theta))^2}{b^2} = 1 \quad (1)$$

Equation (1) can be expressed as a quadratic of r in terms of five unknowns ($a_0$, $b_0$, $c_0$, $d_0$ and $e_0$) to simplify to:

$$r^2 \cos(\phi)^2 + r^2 a_0 \sin(\phi)^2 + \quad (2)$$
$$r^2 b_0 \sin(2\phi) + rc_0 \cos(\phi) + rd_0 \sin(\phi) + e_0 = 0$$

where, $$a_0 = \frac{b^2 \sin(\theta)^2 + a^2 \cos(\theta)^2}{b^2 \cos(\theta)^2 + a^2 \sin(\theta)^2} \quad (3)$$

$$b_0 = \frac{(b^2 - a^2) \sin(\theta) \cos(\theta)}{b^2 \cos(\theta)^2 + a^2 \sin(\theta)^2} \quad (4)$$

$$c_0 = 2\left[\frac{b^2[X\cos(\theta) + Y\sin(\theta)] + a^2[X\sin(\theta) - Y\cos(\theta)]\sin(\theta)}{b^2 \cos(\theta)^2 + a^2 \sin(\theta)^2}\right] \quad (5)$$

$$d_0 = 2\left[\frac{b^2[X\cos(\theta) + Y\sin(\theta)]\sin(\theta) - a^2[X\sin(\theta) - Y\cos(\theta)]\cos(\theta)}{b^2 \cos(\theta)^2 + a^2 \sin(\theta)^2}\right] \quad (6)$$

$$e_0 = 2\left[\frac{b^2[X\cos(\theta) + Y\sin(\theta)]^2 + a^2[X\sin(\theta) - Y\cos(\theta)]^2 - a^2 b^2}{b^2 \cos(\theta)^2 + a^2 \sin(\theta)^2}\right] \quad (7)$$

Embodiments provide at least five acoustic sensors 204 to provide the processor with at least five distance measurements from five or more acoustic sensors 204 (only one of which is shown in FIG. 7) to the borehole 700 wall. In embodiments, at least one acoustic sensor 204 is provided at each 72° segment around the circumference of casing 20. The processor uses these five or more distance measurements to calculate the five coefficients defined in Equations (3)-(7).

In embodiments, receiver circuitry 224 (FIG. 3) receives two-way travel times from each of the five or more acoustic sensors 204. A processor uses these two-way travel times in addition to an approximated annulus 26 material velocity to estimate r and φ for each of the included acoustic sensors 204, and with further consideration to the approximate or known placement of each acoustic sensor 204 on casing 20. Annulus material velocity and estimation thereof is described in more detail below with respect to FIGS. 8-10.

Using least square fitting, the processor estimates the five coefficients from a best fit ellipse Q(φ) as the object function.

The processor can calculate the inclination angle θ of the borehole based on Q(φ) by finding the angle φ at which the major axis of the object function Q(φ) is at its maximum. Using a major axis direction of θ and defining φ=θ, Q(φ)−Q(φ+π) produces the length of the major axis. Further, given $$\phi = \theta + \frac{\pi}{2}, Q(\phi) - Q(\phi + \pi)$$

represents the minor axis of Q(φ). As the borehole center 704 represented by coordinates (X, Y) is defined based on the major axis Io of the best-fit ellipse Q(φ) major axis location and length, and based on the determined inclination angle θ of the casing center 706, the processor in accordance with some embodiments can determine the casing 20 placement within the borehole 700.

Annulus Fluid Identification based on Two-Way Travel Times of Acoustic Signals

As described earlier herein with reference to FIGS. 4-7, estimation of the correct casing placement in the well depends at least in part on the estimation of annulus 26 material velocity. During a cementing process, the mud, spacer and cement slurries are sequentially passing through the annulus 26. The acoustic velocities of these three fluids are different. Afterward, during a cement curing process, the cementing material itself changes from its liquid state to solid state, and the acoustic velocity of the cement itself will change throughout this process. It is important to know and understand these velocities to accurately determine casing 20 placement, and methods and systems for determining these velocities can also aid in monitoring the cementation process and identifying annulus 26 fluids.

Figure 8:
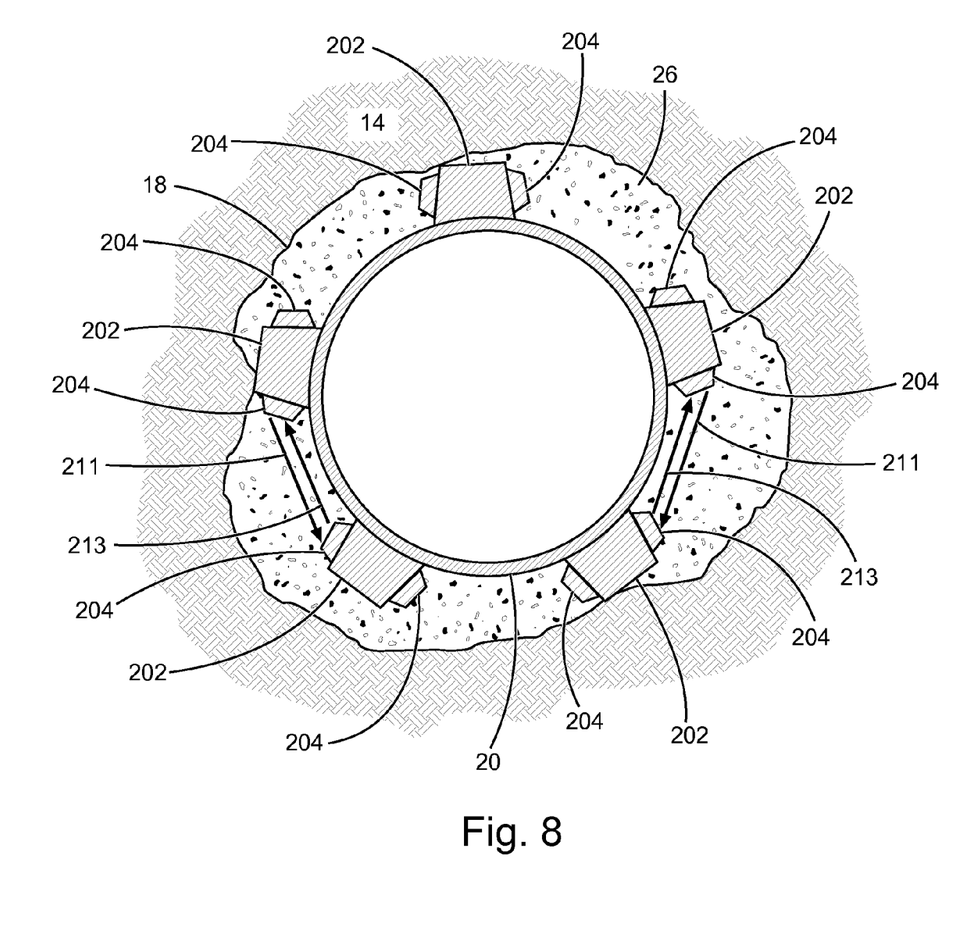
FIG. 8 depicts a top view of casing having an acoustic system mounted thereto in accordance with a second embodiment.

Configurations as shown in FIG. 4, which was described above as being used to help determine casing 20 placement, can also be used for estimation of annulus material velocity and fluid identification. In addition to configurations described above with reference to FIG. 4, other configurations can be used to monitor or identify fluids within the annulus based on two-way travel times of acoustic signals. An example additional configuration for fluid identification and monitoring is depicted in FIG. 8. FIG. 8 depicts a top view of casing 20 having acoustic sensors 204 mounted thereto in accordance with these embodiments.

Similarly to FIG. 4, acoustic sensors 204 shown in FIG. 8 are mounted on the outside of the casing 20 and can detect, identify, and monitor fluids in the annulus 26. However, in the illustrative example embodiment of FIG. 8, the acoustic sensors 204 will mount on facing surfaces of neighboring casing centralizers 202 to sense or identify fluids between neighboring casing centralizers 202. For at least these reasons, acoustic signals 211, 213 may not be reflected from the borehole wall and at least these embodiments may not be useful for detecting position of the casing 20 in the borehole because two-way travel times to the borehole wall are not obtained. On the other hand, embodiments similar to those depicted in FIG. 8 can be used to measure velocities of fluids based on either a one-way travel time (one of 211 or 213) or a two-way travel time (both 211 and 213) between two adjacent acoustic sensors 204 spaced a known distance apart. Further, embodiments similar to those depicted in FIG. 8 can measure velocities of fluids without relying on reflections from a borehole wall, thereby removing uncertainties and inaccuracies that can be generated because of the unevenness of a borehole wall surface.

Figure 9:
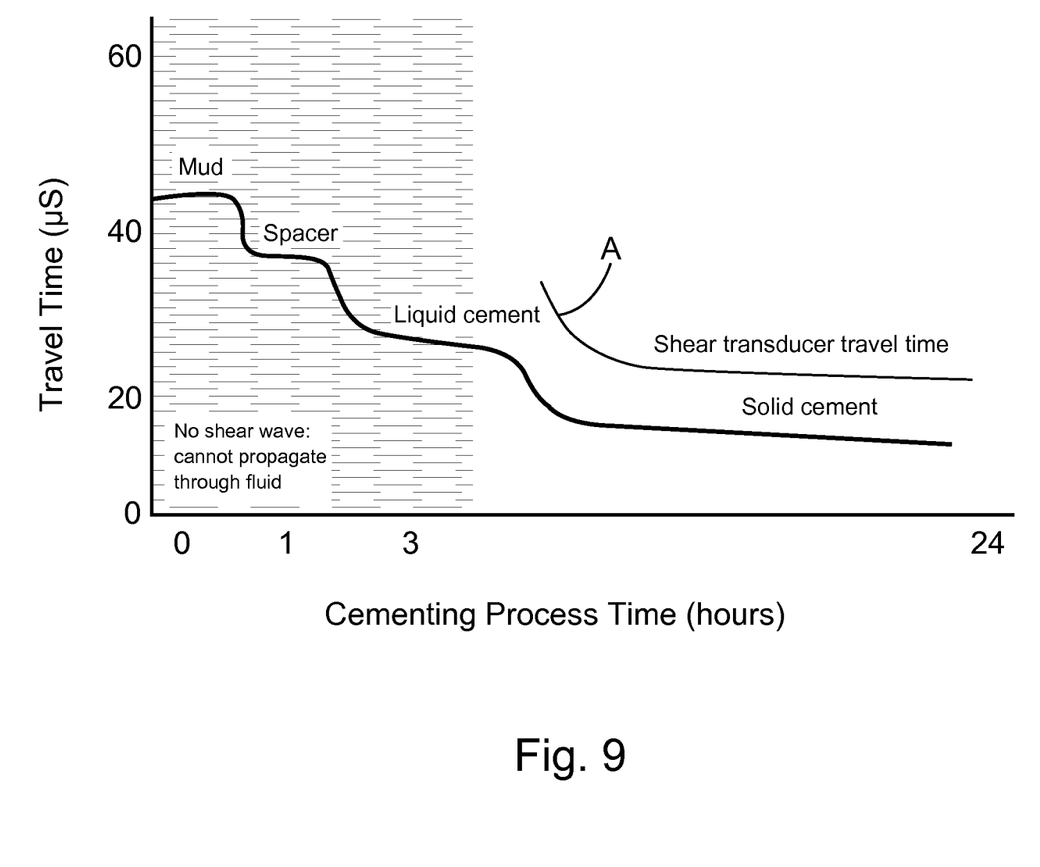
FIG. 9 illustrates an example two-way travel time history measured for annulus fluids during a cementing process in accordance with some embodiments.

FIG. 9 illustrates an example two-way travel time history measured for selected annulus 26 fluids during a cementing process in accordance with some embodiments. As shown (and as also described earlier herein with reference to FIG. 1), at a beginning of a cementing process, mud will be present in annulus 26, followed by spacer and liquid cement. While the example illustrated in FIG. 9 shows two-way travel time history for mud, spacer, and cement, other fluid acoustic velocities for any other fluids can be similarly analyzed and depicted.

Acoustic sensor configurations as shown in FIGS. 4 and 8, as well as other acoustic sensor configurations, can be used to generate two-way travel time histories of FIG. 9 by emitting a series of acoustic signals 211 at various time instances and receiving a corresponding series of reflections 213 to determine a set of two-way travel times. These two-way travel times can be compared at various time instances to determine whether properties of the fluids have changed. A processor or system, such as surface system 38, can select a time duration that is to elapse between each acoustic signal 211 of the series of acoustic signals based on an amount of time that has elapsed since the onset of a wellbore cementation process, for example, or on any other criteria such as the expected identity of fluid in annulus 26.

FIG. 9 can be based on histories for two-way travel time T1 (FIG. 6). However, any other two-way travel times, for example two-way travel times T2 and T3, can additionally be analyzed. As described earlier herein, two-way travel time T1 is based on the time when a first reflection 540 (FIGS. 5 and 6) is received by receiver circuitry 224 (FIG. 3), relative to the time the corresponding acoustic signal was transmitted by transmitter circuitry 218 (FIG. 3).

Components of electrical circuitry 214 can record and analyze two-way travel time histories through a cement hardening process, which can generally take between 4 and 48 hours depending on the cement chemistry profile. As can be seen upon examination of FIG. 9, mud will have relatively the slowest acoustic speeds compared to spacer and cement, in other words, reflections of waves transmitted by a given acoustic sensor 204 into mud will typically be reflected and arrive later at acoustic sensor 204 than would be the case if the waves were transmitted into spacer or cement. Based on the generally accurate assumption that a borehole and casing 20 will remain in a relatively stable position, any two-way travel time T1, T2, T3 changes will be caused by material changes within the annulus.

By monitoring position and movement of acoustic systems 200 during a cementation process or any well maintenance or recovery processes, embodiments enable operators to monitor fluid movement within annulus 26. Embodiments monitor acoustic speed of the material in annulus 26 to establish fluid identification for purposes of, for example, determining a top of cement (TOC) condition.

Further, some embodiments make use of the phenomenon that materials in a fluid state are unable to sustain shear wave propagation. Systems and methods according to some embodiments can determine that that cement in annulus 26 has achieved a cured, or hardened, state if shear waves are able to propagate through the cement. In at least these embodiments, acoustic sensors 204 may include shear transducers to emit shear waves into annulus 26 and to receive reflections of shear waves from boundaries. However, embodiments are not limited to providing separate shear transducers. Shear transducers could be used as in pulse/echo or pitch/catch mode as described earlier herein regarding acoustic transmitters 206 and acoustic receivers 208 or acoustic transmitter 206 can generate shear waves to be received by acoustic receiver 208.

The reflected shear signal will be observed only when the cement becomes solid because shear waves cannot propagate through materials in a fluid phase. The typical two-way travel time response of shear waves is shown in Curve A of FIG. 9. It will be observed that there is no discernible shear arrival before cement presence inside annulus 26.

Figure 10:
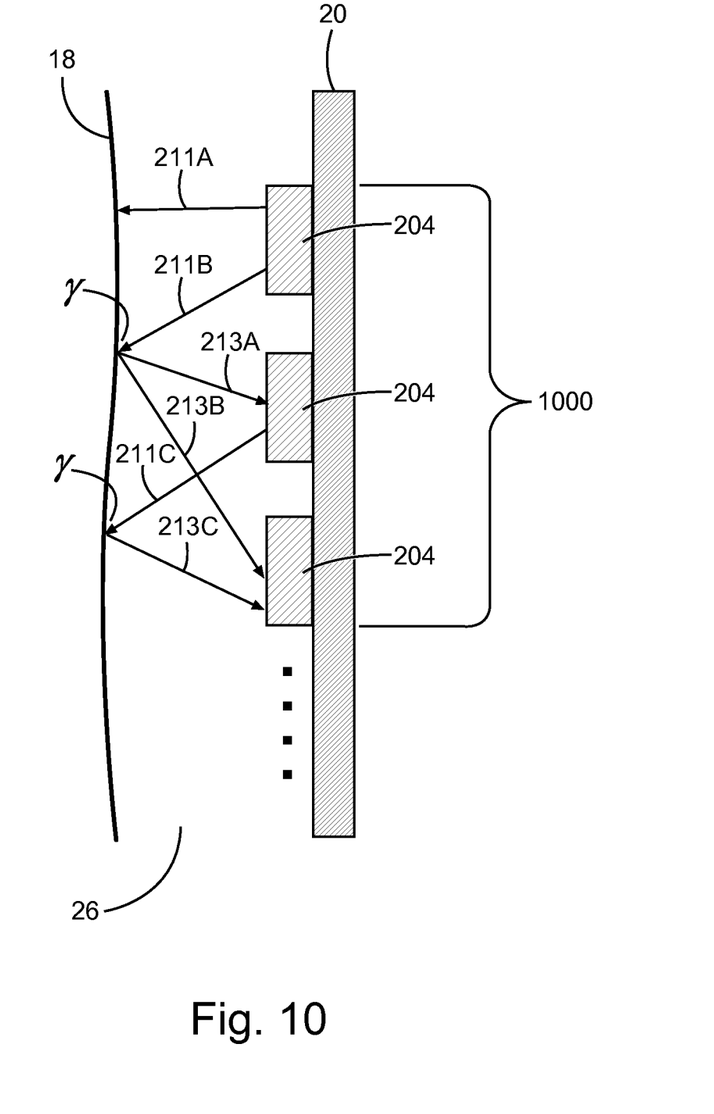
FIG. 10 is a partial depiction of an array of acoustic sensors in longitudinally-spaced relationship to one another in accordance with some embodiments.

Shear waves can also be monitored by using an array of acoustic sensors. FIG. 10 is a partial depiction of a set of acoustic sensors 204 arranged in an array 1000 of acoustic sensors 204 in longitudinally-spaced relationship to one another in accordance with some embodiments. Each of acoustic sensors 204 can emit compression waves, shear waves, or a combination thereof, and each of these waves will have an angle of incidence $\gamma$ on a surface, for example, on the wellbore 18 wall.

Depending on the material that is within annulus 26, and depending on the angle of incidence $\gamma$, the compression waves and shear waves will be refracted by a different angle at wellbore 18 wall or other boundary, because of the differing velocities of compression waves and shear waves and in accordance with Snell's Law as understood by those of ordinary skill in the art. The same acoustic sensor 204 (if the angle of incidence $\gamma$ is normal to the surface) or other acoustic sensors 204 in array 1000 will then receive converted compression waves, shear waves, or combination thereof at various amplitudes and with various time delays, depending on the material in annulus 26 and based at least in part on Snell's Law.

As an illustrative example, if the material in annulus 26 is comprised entirely of a material in a fluid phase, no shear waves will be received by acoustic sensors 204 in array 1000 and only compression waves will be received by acoustic sensors 204. Therefore, embodiments can determine that cement within annulus 26 has cured based on whether shear waves are received by an acoustic sensor 204 of array 1000.

As an additional example, an acoustic sensor 204 may emit an acoustic signal 2118 that includes compression waves into annulus 26, and the compression waves may strike the wellbore 18 wall with an angle of incidence $\gamma$ and be converted into a converted wave with a converted compression 213A and shear 2138 wave components. If the material in annulus 26 includes cured (e.g., solid) cement, at least one acoustic sensor 204 of array 1000 will receive converted compression waves 213A at an amplitude, and converted shear waves 2138 at the same or different amplitude. Further, the converted shear waves 2138 may be received by different acoustic sensors 204 of array 1000 because converted shear waves 2138 may be refracted at a different angle (due to differing velocities of compression waves and shear waves and in accordance with Snell's Law) to be received by a different acoustic sensor 204.

In accordance with some embodiments, a delay can be observed between the time when converted compression waves 213A are received at the receiving acoustic sensor 204 and the time at which converted shear waves 2138 are received based on the different velocities $V_p$ and $V_s$ of compression waves and shear waves, respectively, in cement. Travel time histories and amplitudes for received reflections of compression waves and shear waves can be calculated, displayed, stored, or otherwise processed for each acoustic sensor 204, to monitor cure state of cement in annulus 26.

Operators can design or configure spacing between the acoustic sensors 204 based on expected material properties within annulus 26 and control system 222 (FIG. 3) can control transmitter circuitry 218 to provide different acoustic sensors 204 with signals at different times based on, for example, expected hydration state of cement, expected or actual fluid identities within annulus 26, or any other criteria. For example, the expected amplitude of received converted compression waves and shear waves may be expected to be maximized if the angle of incidence γ is between 30 and 45 degrees (depending on expected formation velocities), and accordingly different acoustic sensors 204 may be controlled to emit waves at a desired angle of incidence γ to maximize the amplitude of received converted compression waves and shear waves and to enhance detectability and sensitivity of acoustic systems 200 in accordance with some embodiments.

A surface system 38 can generate and display data for each acoustic sensor of array 1000 to describe time data and amplitude data, etc., for each type of wave detected by the corresponding acoustic sensor 204.

Figure 11:
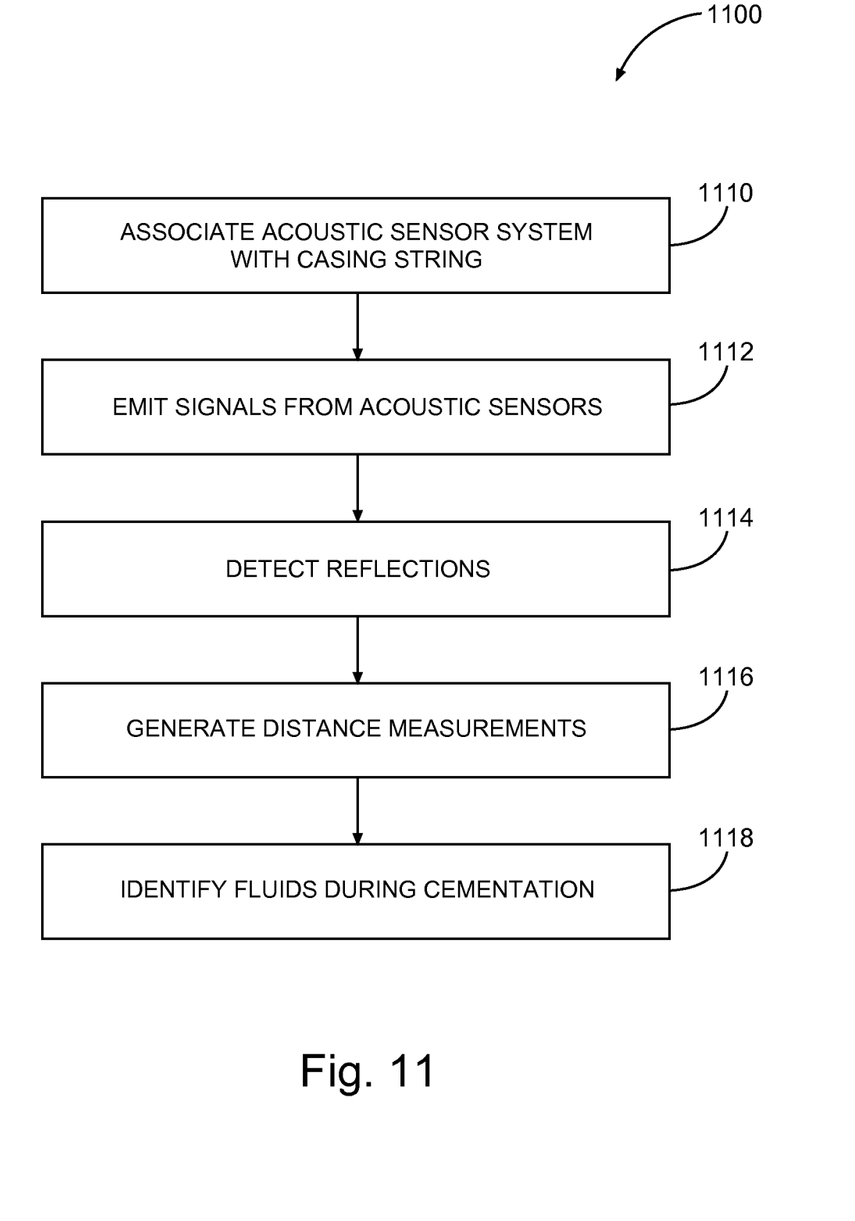
FIG. 11 depicts a flow chart of an example method as can be used for using acoustic signals to determine casing placement in a borehole and to identify fluids within an annulus using acoustic signals in accordance with some embodiments.

FIG. 11 depicts a flow chart of an example method 1100 for using acoustic systems 200 to determine casing 20 placement in a borehole and to identify fluids within an annulus 26 in accordance with some embodiments. Some operations of method 1100 may be implemented by surface system 38 (FIG. 1), transmitter circuitry 218 or receiver circuitry 224 (FIG. 3), processors of surface system 38 or of any other component of electrical circuitry 214 (FIG. 3) and acoustic sensors 204 (FIGS. 2-10).

In operation 1110, at least one acoustic system 200 is deployed on a casing 20. Acoustic systems 200 can be deployed in any configurations described above with reference to FIGS. 4, and 8, although embodiments are not limited thereto. Casing 20 will be placed in a borehole in a subterranean formation to define an annulus 26 between casing 20 and the subterranean formation 14. Acoustic system 200 will include a number of acoustic sensors 204 azimuthally offset from each other on the exterior of casing 20 as described with reference to FIG. 4, on casing centralizers 202 as described with reference to FIG. 8, or longitudinally offset from each other as described with reference to FIG. 10. However, embodiments are not limited to the mounting configurations shown in FIGS. 4, 8, and 10, and acoustic sensors 204 can be mounted in any other configuration.

The example method 1100 continues at operation 1112, with emitting acoustic signals from each of acoustic sensors 204 into annulus 26. As described earlier herein regarding FIGS. 2 and 3, transmitter circuitry 218 can provide these signals to an acoustic transmitter 206, under the control of a control system 222 controlling a pulsar 220 to provide inputs to transmitter circuitry 218.

The example method 1100 continues at operation 1114 with detecting reflections of the acoustic signals at acoustic sensors 204 from a boundary, to generate a set of two-way travel times for the acoustic signals to travel between the plurality of acoustic sensors and the boundary. As described earlier herein with reference to FIG. 2, the boundary can include a boundary between two distinct materials. The reflections can include converted compression waves, converted shear waves, or a combination thereof. Receiver circuitry 224 can receive signals representative of the reflections over connection 210 from acoustic sensors 204, to be digitized and prepared for telemetry by A/D converter 226 and signal detection circuitry 228 (FIG. 3).

The example method 1100 continues at operation 1116 with generating distance measurements representative of distances between corresponding acoustic sensors 204 and points on the borehole wall. As described earlier herein with reference to FIGS. 5 and 6 these distances can be calculated based on first two-way travel time T1 or other two-way travel times T2, T3, etc., of first compression waves. A processor can calculate the position using Equations (1)-(7), for example, as described earlier herein with reference to FIG. 7.

The acoustic sensors 204 can subsequently receive any number of compression waves or shear waves as reflections of the initially-provided acoustic signals from same surface or different surfaces. Processors can determine properties of fluids in the annulus 26 based on two-way travel times and amplitudes of the reflections as described earlier herein. Two-way travel times or other parameters of the reflections can be recorded in memory 230 (FIG. 3) or in memory of surface system 38. Changes in fluid properties or identities can be detected and monitored based on changes in these two-way travel times and other parameters.

The method can further include providing expected acoustic signatures for acoustic sensors 204, wherein these acoustic signatures include expected two-way travel times and amplitudes of respective received compression waves. A particular acoustic sensor 204 can then be identified, by components of electrical circuitry 214 or of surface system 38, based on a corresponding acoustic signature. As described above, the method can include detecting hardened or cured cement based on reception of shear waves.

Processors of surface system 38 can access or retrieve data from a lookup table that defines fluid types of fluids within the annulus based on two-way travel times or other parameters, wherein the lookup table was previously generated based on laboratory measurements or field experiments using actual or expected annular fluids. By comparing obtained two-way travel times and other parameters with these predicted or estimated characteristics, processors can detect presence (or absence) of a particular fluid in operation 1118 to identify what fluids are present at the location of acoustic systems 200, and these comparisons may be used to help monitor, for example, a cementing operation (for example, to determine the TOC).

In many examples, the measurements and/or the determined two-way travel times will be telemetered to surface system 38, which may be done essentially in real time or at selected intervals. Surface system 38 can use these measurements, after placement of the cement, to identify the cure state of the cement, and also during cure or at later intervals to identify any fluid incursion of the cement barrier.

In examples of the described method, surface system 38 can receive measurements over communication circuitry 232 and over a variety of time intervals and display layer boundaries, or another fluid parameter, as a function of time, acoustic frequency, etc. on a display unit of surface system 38 or a remote display unit. In some embodiments, processors, surface system 38, or another system can model, invert, or provide display of the measured acoustic parameters or other parameters.

The various electronic circuits within each casing centralizer 202 can communicate as desired with circuitry in another casing centralizer 202. Such communications between can occur through use of any suitable mechanism as will be apparent to those skilled in the art, for example, through use of a serial peripheral interface (SPI), though embodiments are not limited thereto.

As is apparent from the discussion above, in many example systems, a plurality of acoustic systems 200 will be disposed in longitudinally spaced relation to each other along casing 20, at least over a region of interest relative to either the sealing operation or to other downhole conditions.

Accordingly, by sensing fluids of a certain type in response to detecting acoustic two-way travel times, a location, in particular TOC, can be determined by finding a location on casing 20 where below it, acoustic two-way travel times with a first value characteristic of the sealant are identified, while above the location, only acoustic two-way travel times characteristic of other fluids, for example spacer fluid or drilling mud, are identified. Furthermore, monitoring of quality of barrier, and fluid discrimination can be performed using apparatuses and methods in accordance with some embodiments.

In different examples, TOC measurement can be done after the pumping of the sealant is completed or the measurement can be a dynamic measurement of the TOC while the sealant is moving up annulus 26. The other measurements described herein facilitate measurements not only of the TOC, but also of the distribution of the cement or other sealant around the casing over the region of the casing string that includes acoustic systems 200. Identifying the depth where this occurs facilitates remediation efforts.

Each acoustic system 200 can report information associated with acoustic sensors 204 to a surface system, for example surface system 38, using communication methods known to those of ordinary skill in the art having benefit of this disclosure.

The novel techniques described above can determine casing placement in a wellbore as well as properties of sealant (or another fluid in the wellbore) by emitting acoustic signals into the wellbore and analyzing two-way travel times of reflected signals reflected by those acoustic signals hitting a boundary between different materials. In summary, using the apparatus, systems, and methods disclosed herein can provide indications of various properties or conditions downhole, and in particular can provide information regarding the top of cement and the quality of the barrier proximate different acoustic systems.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement configured to achieve the same purpose may be substituted for the specific embodiments shown. This disclosure is intended to cover any and all adaptations or variations of various embodiments. Combinations of the above embodiments, and other embodiments not described herein, will be apparent to those of skill in the art upon reviewing the above description.

What is claimed is:

1. A method comprising:
    emitting acoustic signals from each of a plurality of acoustic sensors that receives inputs from transmitter circuitry into an annulus, the plurality of acoustic sensors being mounted on an exterior of a casing and azimuthally offset from each other around the exterior of the casing, the casing placed in a borehole in a subterranean formation to define the annulus and the transmitter circuitry positioned within a centralizer coupled to the casing;
    detecting reflections of the acoustic signals to generate a set of two-way travel times for the acoustic signals to travel between corresponding acoustic sensors of the plurality of acoustic sensors and a boundary from which the acoustic signals were reflected; and
    generating distance measurements representing distances between the corresponding acoustic sensors and the boundary, based on the two-way travel times, to determine a position of the casing within the borehole.

2. The method of claim 1, wherein at least one of the reflections includes a shear wave, and wherein the method further comprises determining that a material in the annulus includes cured cement responsive to detecting the shear wave.

3. The method of claim 2, wherein each of the plurality of acoustic sensors is mounted in a longitudinally-spaced relationship to each other along the casing, and wherein emitting the acoustic signals from each of the plurality of acoustic sensors further comprises: selecting an acoustic sensor of the plurality of acoustic sensors to emit an acoustic signal that has an angle of incidence at the boundary such that a reflection of the acoustic signal is detected at a different acoustic sensor of the set of acoustic sensors.

4. The method of claim 3, wherein selecting the acoustic sensor further comprises selecting the acoustic sensor to emit the acoustic signal based on an expected property of fluid in the annulus.

5. The method of claim 3, wherein selecting the acoustic sensor further comprises selecting the acoustic sensor to emit the acoustic signal based on a time duration that has elapsed since an onset of a wellbore cementation process.

6. The method of claim 4, further comprising: controlling whether the acoustic sensor emits compression waves, shear waves, or both compression waves and shear waves based on the expected property of a fluid in the annulus.

7. The method of claim 6, further comprising: generating display data for each acoustic sensor of the set of acoustic sensors to describe time data and amplitude data for each type of wave detected by the corresponding acoustic sensor; and displaying the display data.

8. The method of claim 1, wherein emitting the acoustic signals from each of the plurality of acoustic sensors further comprises emitting a series of acoustic signals from each of the acoustic sensors to generate a series of reflections, each reflection of the series of reflections having a corresponding two-way travel time, and the method further comprises comparing the two-way travel times to determine whether a property of the fluid has changed.

9. The method of claim 8, further comprising: selecting a time duration to elapse between each acoustic signal of the series of acoustic signals based on an amount of time that has elapsed since an onset of a wellbore cementation process.

10. The method of claim 1, further comprising: mixing a cement-based substance to form a cement slurry; pumping the cement slurry down the inside of the casing into the subterranean formation after the casing and the plurality of acoustic sensors are in the borehole; and monitoring a hydration state of the cement slurry.

11. An assembly comprising:
    a casing having an acoustic system and a centralizer mounted on an exterior of the casing, the casing to be placed in a borehole in a subterranean formation to define an annulus between the casing and the subterranean formation, wherein the acoustic system comprises, transmitter circuitry positioned within the centralizer, a plurality of transmitters to receive pulse inputs from the transmitter circuitry and to emit acoustic signals into the annulus in response to receiving the pulse inputs, the acoustic signals including at least one type of wave selected from a group including compression waves and shear waves, a plurality of receivers to detect reflections of the acoustic signals off of a boundary between two distinct materials and to generate a set of two-way travel times for the acoustic signals to travel between the boundary and the corresponding transmitter, and a processor to generate distance measurements between the acoustic system and the boundary, based on the two-way travel times, to determine a position of the casing within the borehole.

12. The assembly of claim 11, wherein the transmitter circuitry is configured to provide pulse inputs within a frequency range of about 50 kHz to 500 kHz.

13. The assembly of claim 11, further comprising: communication circuitry to transmit, to a surface system, the two-way travel times.

14. The assembly of claim 13, wherein the communication circuitry includes components for wireless communication.

15. The assembly of claim 13, further comprising memory to store the set of two-way travel times.

16. The assembly of claim 11, further comprising: a second acoustic system that includes a set of acoustic sensors mounted such that a first acoustic sensor of the set emits an acoustic signal and the first acoustic sensor detects a reflection of the acoustic signal reflected by a second acoustic sensor of the set to generate a travel time between the first acoustic sensor and the second acoustic sensor.

17. An apparatus for a casing to be positioned within a borehole, the apparatus comprising:

a centralizer configured to be coupled to an outer surface of the casing; and an acoustic sensor configured to couple to the outer surface of the casing, the acoustic sensor including a transmitter, transmitter circuitry positioned within the centralizer, and a receiver, the transmitter being configured to receive a pulse input from the transmitter circuitry and emit an acoustic signal into the borehole responsive to receiving the pulse input, the receiver being configured to detect reflections of the acoustic signal; and a processor to determine two-way travel times of acoustic signals emitted by the plurality of acoustic sensors based on a time at which reflections were detected and a time at which the acoustic signals were emitted, and determine a position of the casing in the borehole based on the two-way travel times.

18. The apparatus of claim 17, wherein the acoustic sensor includes a first transducer portion configured to act as the transmitter and a second transducer portion configured to act as the receiver.

19. The apparatus of claim 17, wherein the acoustic sensor includes a transducer portion configured to act as both the transmitter and the receiver.

20. The apparatus of claim 17, wherein the transmitter is configured to transmit shear waves.

21. The apparatus of claim 17, wherein the transmitter is configured to transmit compression waves, shear waves, or a combination of compression waves and shear waves.

* * * * *